May 27, 1969
A. G. BODINE
3,446,666
SONIC PROCESS AND APPARATUS FOR CLEANING PIPES
Filed Aug. 29, 1966
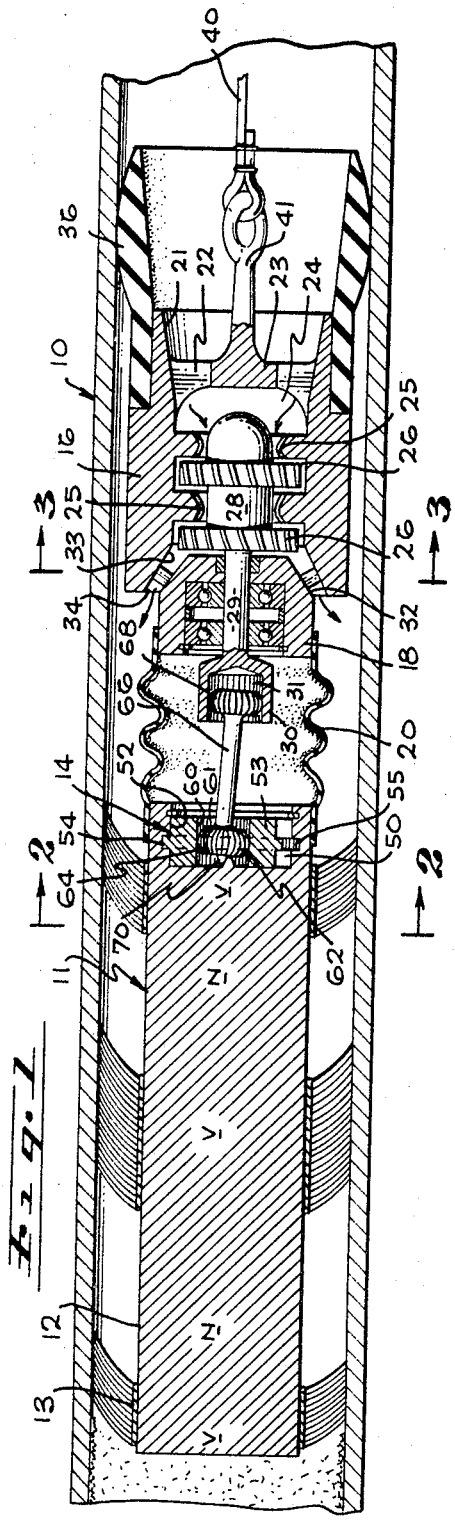
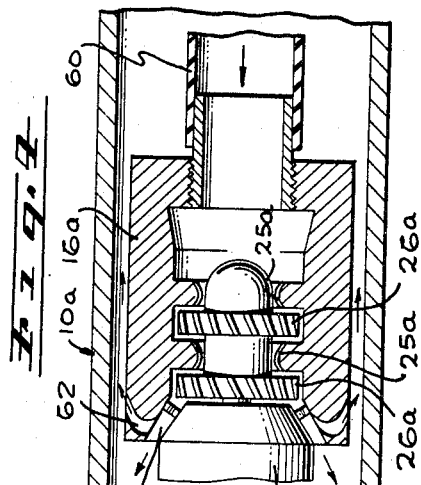
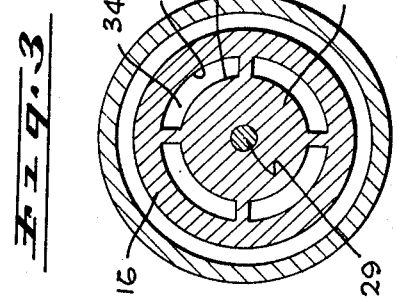
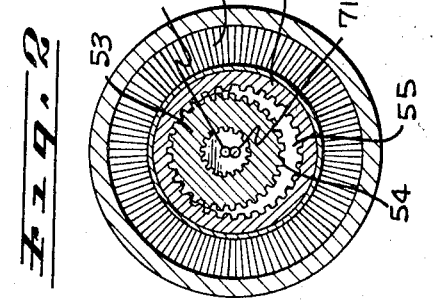
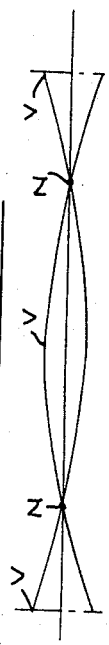
INVENTOR.
ALBERT G. BODINE
BY
ATTORNEY United States Patent Office 3,446,666
Patented May 27, 1969

3,446,666
SONIC PROCESS AND APPARATUS FOR CLEANING PIPES
Albert G. Bodine, Los Angeles, Calif.
(7877 Woodley Ave., Van Nuys, Calif. 91406)
Filed Aug. 29, 1966, Ser. No. 575,707
Int. Cl. B08b 9/02, 3/10
U.S. Cl. 134—1                                    10 Claims

ABSTRACT OF THE DISCLOSURE

An elastic rod member having a plurality of bristles extending therefrom is placed within a pipe to be cleaned. The elastic rod member is set into a mode of resonant standing wave vibration by means of a vibration generator, the high level sonic energy thus developed acting to loosen and remove dirt and other encrustations from the surfaces of the pipe.

---

This invention is concerned with sonic methods and apparatus for cleaning of pipes carrying fluids which cause these pipes to become dirty or to accumulate thick coatings of soft to relatively hard materials, and including encrustations which are deposited over long periods of time and may be quite resistant to ordinary methods of removal. The invention has in contemplation particularly pipes or pipe lines which may be buried in the ground, or embedded either within or under permanent building structures, but to which access may be attained, and an open end exposed, permitting insertion of the sonic equipment of the invention and travel thereof for the length of the pipe to be cleaned.

A general object of the invention is provision of improved methods and apparatus for cleaning out such pipe lines, and the invention consists in making use of sonic vibrations at high energy level such as will generate a condition of cavitation in the liquid within the pipe, adjacent the inner surface of the latter, so that dirt or other deposits thereon may be removed by the disruptive effects of cavitation. In addition, the apparatus of the invention employs a sonic vibratory brushing or scratching action on the interior surface of the pipe, so that the material to be cleaned off the surface of the pipe is removed by either or both of cavitation and highly energetic brushing or scratching. By these procedures, strikingly effective clean-out of pipes, at a performance rate not heretofore realized as possible, has been made available.

A feature of the invention is the provision of a sonic machine which is propelled through the pipe being cleaned by virtue of pressure of liquid which is pumped into the pipe and then to and through the sonic apparatus. This liquid, as it passes through the apparatus, is also used to drive a turbine, which in turn drives a sonic vibration generator which establishes the sonic vibration performance of the invention. A further feature is the use of a cable tether which is attached to the apparatus and which holds the apparatus back to control its rate of progression by the pressure of the drive liquid.

The invention, in one form herein chosen for illustrative purposes, utilizes an elongated elastic bar or rod composed of steel or similar elastic material, and of a diameter somewhat less than that of the pipe line to be cleaned, so that it can enter and travel along the interior of the pipe line with substantial clearance. This elastic rod is set into a mode of resonant standing wave vibration, and while any of several well-known standing wave modes are useful, that here specifically disclosed is a gyratory mode, of unusually high effectiveness, wherein points along the rod move in circular paths in planes transversely of the rod. This occurs without bodily rotation up the rod. Such gyratory motion is seen, upon analysis, to comprise the resultant of two sinusoidal vibrations in directions at right angles to one another in transverse planes of the rod, the vibrations being at ninety degrees phase difference, i.e., in "quadrature." This mode of vibration was described and illustrated in my Patent No. 2,960,314, FIGURES 1 through 4 thereof. The gyratory standing wave pattern described is usually of one full wavelength, and is set up when excited at the resonance frequency for this fundamental wave pattern. This fundamental wave pattern is characterized by velocity antinodes at the two ends of the rod and at the center thereof, with velocity nodal regions at points approximately twenty percent inward from each end of the rod. The rod is driven to undergo this gyratory resonant standing wave performance by a vibration generator or oscillator of a gyratory type, located at its rearward end velocity antinode.

It may here be mentioned that it is of importance in the practice of the invention that the apparatus form a discrete resonant acoustic circuit, which may be composed of the already mentioned sonically gyratory resonant rod, the vibration generator, and a motor member which has a characteristic of inverse speed responsiveness to load. In one form of the apparatus, this motor means is of a fluid-driven character and may be a turbine, as heretofore mentioned. The "load" on the system comprises the layers of dirt, deposits or encrustations on the inner surface of the pipe which are worked on by the aforementioned sonic brush, preferably stiff bristles projecting laterally from the vibratory rod, these deposits offering large frictional resistance to the bristles vibrating with the resonator rod. Additional load of a reactive character is presented by the mass and elastic compliance effects of the liquid surrounding the gyrating rod; and finally, energy consumption, and therefore an equivalent resistive or energy-consuming effect, arises out of the work done when cavitation is established and acts to clean the pipe.

It will be seen that the "load" on the system has both reactive and resistive components, which add vectorially to present to the system an impedance. Moreover, this impedance varies from point to point along the pipe line as more or less encrustations are encountered, as well as with progress of the cleaning operation.

It is the main object of the invention to provide a sonically vibratory pipe cleaning system which automatically adjusts and accommodates its performance for maximum energy delivery as the factor of impedance varies from time to time or from place to place in the operation of the system.

The last-named objective of the invention is made possible by the utilization of a sonic vibration generator of a certain orbital-mass type of mechanical vibrator which has the desired automatic accommodation to variations in the impedance of the dirt and encrustation material within the pipe line.

These so-called "orbital-mass" vibration generators may take any of various mechanical forms, one of the simplest and best of which involves a roller mass rolling around in a bearing, so that the mass generates a centrifugal force which is reactively opposed by the bearing. The bearing is in a housing, which in response to the centrifugal force so generated, exerts a periodic inertial force on whatever may support it or be coupled thereto. An example of a suitable form of such an orbital-mass generator is disclosed in my Patent No. 3,217,551.

Acoustically speaking, the impedance of the resonantly gyrating resonator bar, or of any portion of the acoustic circuit, is a complex quantity proportional to the ratio of force to vibratory velocity at any point along the rod, or in the acoustic circuit, as the case may be. As regards the load on the resonator rod, the total resultant impedance thereof, and against which the resonator rod must vibrate, depends upon the variable factors of friction between scratcher bristles and the encrustations on the inside of the pipe, the equivalent resistance corresponding to energy consumption by the phenomenon of cavitation in working its cleaning action in the pipe, and the reactance factors of mass and compliance both as regards the surrounding fluid, and the scratcher bristles. The total impedance of the load, as said above, is the vector resultant of these reactance and resistant components. This impedance, and the optimum phase angle, power factor and frequency for desired resonance, depend upon the magnitudes of these parameters at any particular instant, and can vary from instant to instant. The orbital-mass oscillator accommodates automatically to these variations in impedence, including change of phase angle of its orbiting mass relative to the resonating rod, with accompanying change of power factor, and/or frequency, assuring thereby effective and sustained delivery of large sonic energy to the "work," under which conditions the cleaning action proceeds at maximum effectiveness.

The orbital-mass oscillator adjusts its output frequency to maintain resonance with changes in the impedance of the circuit. Thus, in the face of changes in the effective mass and compliance presented by the load, the system automatically maintains itself in optimum resonant operation by virtue of a resonant frequency "lock-in" characteristic of the orbital-mass generator. In order to attain optimal performance, the orbital-mass oscillator is dimensioned and designed so that, with the drive effort properly adjusted, it will tend to lock in for operation at a frequency just on the low side of that for peak resonance. The oscillator then automatically changes its frequency and also its phase angle and therefore its power factor to correspond with changes in the resistive components of load impedance comprised of the cleaning work load which has been imposed on the system. It can be seen that the output portion of the acoustic circuit involved in the invention comprises the encrustations of the inside of the pipe, the frictional resistance offered by the inside of the pipe to the scratcher bristles when the pipe has been cleaned, the equivalent resistance owing to the phenomenon of cavitation as work is done on the encrustations, and the mass and reactance factors owing to the liquid surrounding the resonating rod. Changes in these factors can clearly cause changes in the resonant frequency of the over-all acoustic system. The orbital-mass oscillator accommodates, by changes in frequency, phase angle and power factor, to these changes in impedance as they affect the resonant frequency of the circuit. At the same time, assuming a drive powered to establish operation in the range of resonance, and just below the frequency for peak resonance, and assuming also a drive that has the characteristic of inverse speed responsiveness to load, the drive effort can readily be adjusted so that the system locks in at just below the resonant frequency of the circuit, inclusive of the "load." This system has excellent frequency stability.

The orbital-mass oscillator as described above, coupled to a resonator such as an elastically vibratory rod, with the latter sonically coupled to the liquid and to the material to be cleaned from the inside of the pipe, affords a very powerful vibratory system. Such a system, moreover, can be readily designed with sufficient elastic compliance reactance to counteract the mass reactance of the relatively heavy resonator rod and oscillator housing at the resonant operating frequency, and thus virtually cancel out force-wasting mass blocking effects. It is further a definite advantage that the elastic compliance reactance in such a system can readily be made sufficiently large to afford resonant magnification of vibratory amplitudes in the system, and a large energy storage property (often designated "Q"). The system also has a surprising frequency stabilizing feedback effect from the resonator rod to the oscillator, provided, in accordance with the invention, that the oscillator be designed to deliver a cyclic impulse properly related to the reactance and resistance of the resonator rod and of the load, so that the oscillator and the resonator tend to maintain a frequency just below peak resonance, as explained above, and provided further that I drive the oscillator of this combination with a characteristic of inverse speed responsiveness to load. The oscillator then both locks in at such frequency, and automatically adjusts its phase angle to the load resistance. The frequency adjusts to the load reactance. An ideal acoustic system for transmitting large sonic energy into the material to be cleaned from the pipe is thus provided.

Sonic discussion

By the expression "sonic vibration" I mean elastic vibrations, i.e., cyclic elastic deformations, such as longitudinal, lateral, gyratory, torsional, etc., generated in a structure, or which travel through a medium with a characteristic velocity of propagation. There can be such elastically vibratory systems wherein the essential features of mass appear as a localized influence or parameter, known as a "lumped constant;" and another such lumped constant can be a localized or concentrated elastically deformable element, affording a local effect referred to variously as elasticity, modulus, modulus of elasticity, stiffness, stiffness modulus, or compliance, which is the reciprocal of the stiffness modulus. These constants, when functioning in an elastically vibratory system such as mine, have cooperating and mutual influencing effects like equivalent factors in alternating-current electrical systems. In fact, in both distributed and lumped constant systems, mass is mathematically equivalent to inductance (a coil); elastic compliance is mathematically equivalent to capacitance (a condensor); and friction or other pure energy dissipation is mathematically equivalent to resistance (a resistor).

In this invention impedance is important to the accomplishment of desired ends, and is important to consider if optimized energization of a system is desired. If the impedances are adjusted to be matched somewhat, energy transmission is made very effective.

Impedance, in an elastically vibratory system, is, mathematically, the complex quotient of applied alternating force and linear velocity. It is analogous to electrical empedance. The concise mathematical expression for this impedance is $$Z = R + \sqrt{-1}\left(2\pi f M - \frac{1}{2\pi f C}\right)$$

where M is vibratory mass, C is elastic compliance (the reciprocal of stiffness, or of modulus of elasticity) and $f$ is the vibration frequency.

Resistance is the "real" part R of the impedance, and represents energy dissipation, as by friction.

Reactance is the "imaginary" part of the impedance, and is the difference of mass reactance and compliance reactance.

Mass reactance is the positive imaginary part of the impedance, given by $2\pi f M$. It is analogous to electrical inductive reactance, just as mass is analogous to inductance.

Elastic compliance reactance is the negative imaginary part of impedance, given by $1/2\pi f C$. Elastic compliance reactance is analogous to electrical capacitative reactance, just as compliance is analogous to capacitance.

Resonance in the vibratory circuit is obtained at the operating frequency at which the reactance (the algebraic sum of mass and compliance reactances) becomes or approaches zero. Vibration amplitude is limited under this condition to resistance alone, and is maximized. The inertia of the mass elements necessary to be vibrated does not under this condition consume any of the driving force. Moreover, the mass elements are very often beneficial, contributing to the acoustic "Q" of the system A valuable feature of my sonic circuit is the provision of enough extra elastic compliance reactance so that the mass or inertia of various necessary bodies in the system does not cause the system to depart so far from resonance that a large proportion of the driving force is consumed and wasted in vibrating this mass. For example, a mechanical oscillator or vibration generator of the type normally used in my inventions always has a body, or carrying structure, for containing the cyclic force generating means. This supportnig structure, even when minimal, still has mass, or inertia. This inertia could be a force-wasting detriment, acting as a blocking impedance using up part of the periodic force output just to accelerate and decelerate this supporting structure. However, by use of elastically vibratory structure in the system, the effect of this mass, or the mass reactance resulting therefrom, is counteracted at the frequency for resonance; and when a resonant acoustic circuit is thus used, with adequate capacitance (elastic compliance reactance), these blocking impedances are tuned out of existence, at resonance, and the periodic force generating means can thus deliver its full impulse to the "work," which is the resistive component of the impedance.

Sometimes it is especially beneficial to couple the sonic oscillator at a low-impedance (high velocity vibration) region, for optimum power input, and then have high impedance (high force vibration) at the work point. The sonic circuit is then functioning additionally as a transformer, or acoustic lever, to optimize the effectiveness of both the oscillator region and the work delivering region.

The optimal form of my invention employs, as the source of sonic power, a sonic resonant system comprising an elastic member in combination with an orbiting-mass oscillator or vibration generator. This combination has many unique and desirable features. For example, this orbiting-mass oscillator has the ability to adjust its input power and phase to the resonant system so as to accommodate changes in the work load, including changes in either or both the reactive impedance and the resistive impedance. This is a very desirable feature in that the oscillator "hangs on" to the load even as the load changes.

It is important to note that this unique advantage of the orbiting-mass oscillator accrues from the combination thereof with the acoustic resonant circuit, so as to comprise a complete acoustic system. In other words, the orbiting-mass oscillator is matched up to the resonant part of its system, and the combined system is matched up to the acoustic load, or the job to be accomplished. One manifestation of this proper matching is a characteristic whereby the orbiting-mass oscillator tends to "lock in" to the resonant frequency of the resonant part of the system.

The combined system has a unique performance which is exhibited in the form of a greater effectiveness and particularly greater persistence in a sustained sonic action as the work process proceeds or goes through phases and changes of conditions. The orbiting-mass oscillator, in this matched-up arrangement, is able to hang on to the load and continue to develop power as the sonic energy absorbing environment changes with the variations in sonic energy absorption by the load. The orbiting-mass oscillator automatically changes its phase angle, and therefore its power factor, with these changes in the resistive impedance of the load.

A further important characteristic which tends to make the orbiting-mass oscillator hang on to the load and continue the development of effective power, is that it also accommodates for changes in the reactive impedance of the acoustic environment while the work process continues. For example, if the load tends to add either inductance or capacitance to the sonic system, then the orbiting-mass oscillator will accommodate accordingly. Very often this is accommodated by an automatic shift in frequency of operation of the orbiting-mass oscillator by virtue of an automatic feedback of torque to the energy source which drives the orbiting-mass oscillator. In other words, if the reactive impedance of the load changes this automatically causes a shift in the resonant response of the resonant circuit portion of the complete sonic system. This in turn causes a shift in the frequency of the orbiting-mass oscillator for a given torque load provided by the power source which drives the orbiting-mass oscillator.

All of the above mentioned characteristics of the orbiting-mass oscillator are provided to a unique degree by this oscillator in combination with the resonant circuit. The kinds of acoustic environment presented to the sonic source by this invention are uniquely accommodated by the combination of the orbiting-mass oscillator and the resonant system. As will be noted, this invention involves the application of sonic power which brings forth some special problems unique to this invention, which problems are primarily a matter of delivering effective sonic energy to the particular work process involved in this invention. The work process, as explained elsewhere herein, presents a special combination of resistive and reactive impedances. These circuit values must be properly met in order that the invention be practiced effectively.

Reference is now directed to the drawings, wherein:

FIG. 1 is a view of a pipe line longitudinal section, with sonic cleaning apparatus in accordance with the invention positioned therein and shown partly in vertical medial section and partly in elevation;

FIG. 2 is a transverse section taken on line 2—2 of FIG. 1;

FIG. 3 is a transverse section taken on line 3—3 of FIG. 1;

FIG. 4 is a view similar to a portion of FIG. 1 but showing a modification; and

FIG. 5 is a diagram illustrative of a standing wave performance set up in the resonator rod.

Referring now to the drawings, the numeral 10 designates generally a pipe line to be cleaned, it being understood that the pipe line has been uncoupled from its system at some point to the right of the drawing in FIG. 1, so that an open end has been exposed for the sonic machine 11 of the invention to be inserted therein, and so that a coupling for a fluid under pressure, preferably and usually water, can be made between any pressure fluid supply line and this open end of the pipe. This portion of the pipe and the hose coupling thereto is not shown in the drawings, and may be of any well-known nature.

The elastically vibratory resonator component of the illustrative sonic machine comprises a preferably cylindrical steel rod 12, of approximately two-thirds the inside diameter of the pipe 10 to be cleaned. Mounted onto and projecting outwardly from this rod 12 are a multiplicity of stiff wire bristles or scratchers 13, adapted to engage and scratch against the interior of the pipe and any layers of dirt, deposits or encrustations thereon. Preferably, these wires 13 are long enough that they must be fairly substantially bent in order to intrude inside the pipe 10, as shown; and the wires 13 are also preferably made stiff enough and sufficient in number to support the rod 12 fairly centrally within the pipe 10. As here shown, the bristles 13 are provided in three groups, a group near each extremity of the rod 12, and a group in the central region thereof. This is for the reason that the principal vibration amplitude is in these three velocity antinodal regions when a one-wavelength gyratory standing wave is set up in the rod 12, and the bristles in these areas are therefore of most effectiveness. However, if desired, the bristles may be extended along the full length of the rod 12, and of course, the more bristles are used, the better will the rod 12 be centered along the axis of the pipe 10.

The sonic vibration generator or oscillator, of the orbital-mass class heretofore referred to, is designated generally by the numeral 14, housed in this instance within a cylindrical cavity formed in the rearward or tail end of the resonator rod 12.

The apparatus includes, to the rear of the generator 14, a generally cylindrical turbine body or stator 16, which mounts at its forward end a cylindrical bearing housing 18, preferably of the same outside diameter as that of the rod 12, and the rearward end of the rod 12 and this bearing housing 18 are connected by and have sealed thereto a flexible metal bellows 20, which serves the purpose both of connecting the rod 12 and housing 18, and of excluding contaminated liquid from certain bearings and splines located inside thereof, as will presently be described.

The right-hand end of turbine body 16, as viewed in FIG. 1, has an inwardly converging fluid passage 21, leading through ports 22 in a spider 23 to the intake region 24 of the turbine. The latter has two rows of stator vanes 25, and two rows of rotor vanes 26 on a turbine rotor 28, in a conventional arrangement. The turbine rotor has a shaft mounted in bearings in bearing housing 18, as shown, and carries at its forward extremity a universal joint coupling cup 30 containing internal splines 31, for a purpose to be described presently. The rearward end of the bearing housing 18 has an external frustoconical surface 32 confronted, at a suitable spacing, by an internal frustoconical surface 33 defining a divergent turbine discharge duct 34, as shown.

Attached to the rearward end of the turbine body 16 is a flexible rubber packer cup 36, adapted to make sealing contact with the interior surface of the pipe in response to introduction of pressurized fluid inwardly through this cup and on into the turbine.

The turbine body 16 and packer 36 have a sufficient rearwardly projected area exposed to incoming pressure fluid to create a propulsive thrust on the entire apparatus toward the left, as viewed in FIG. 1, so that the apparatus as a whole tends to advance in the pipe when pressure fluid is introduced into the pipe and permitted to flow through the turbine. To control the forward travel of the sonic machine under the influence of this fluid pressure drive, a tether cable 40 is connected to the machine, as by a link 41 extending rearwardly from the hub of spider 23. The cable 40 is paid out to permit the machine to progress under its fluid drive tendency as desired.

There remains for description the orbital-mass vibration generator or oscillator 14. As somewhat diagrammatically here shown, a cylindrical cavity 50 is formed in the rearward end of rod 12, and the outer periphery thereof affords a cylindrical bearing surface 52. Rolling on this bearing surface 52 is an orbital-mass rotor, in the form of a cylindrical roller 53 of substantial mass, and of a diameter somewhat less than that of bearing surface 52, for example in the proportions well illustrated in the drawings. The periphery of the roller 53 is formed with a spur gear 54 which meshes with an internal ring gear 55. The roller 53 thus runs around bearing surface 52, with gear 54 in mesh with gear 55. Roller 53 has an axial bore 60 formed with internal splines 61 which are in mesh with arcuate splines 62 on the head 64 of a conically gyratory connecting rod or shaft 66. The other end of the rod or shaft 66 has a similar arcuately splined head 68 meshing with the aforementioned splines 31 in the universal joint coupling cup 30.

In operation, driving fluid is pumped inwardly into the pipe 10 from the right, and passes through the turbine, so that turbine shaft 29 is driven. Shaft 66 is thereby driven through the effective universal joint coupling comprised of the splined cup and shaft head 68. The splined head 64 on the left-hand end of the shaft 66 is thus rotated. This shaft head 64 has at its extremity an axially positioned cone 70 which is adapted to ride on and around a fixed axial cone 71 projecting axially from the inner face of cavity 50. The cone 71 is thus understood to be coaxial with the cylindrical bearing surface 52. Roller 53 is thereby driven to roll around cylindrical bearing surface 52, with the spur gear 54 on the roller and the internal ring gear 55 on bearing surface 52 in mesh. The conical elements 70 and 71 will be seen to interengage to hold the gears 54 and 55 in mesh throughout the trip of the roller 53 around the bearing surface 52. It is interesting to note that with this type of orbiting-mass generator, each revolution of the shaft 66 produces a substantial number of trips of the roller 53 around the bearing surface 52. There is thus an advantageous substantial step-up in frequency from the revolutions per second of shaft 66 to the number of trips per second of roller 53 around bearing 52.

Roller 53 in thus rolling around the bearing 52 exerts a centrifugal force on the latter, and therefore on the entire rearward extremity of the resonator rod 12. In effect, the rearward end of the resonator rod 12 is subjected to a radial force vector turning about the longitudinal axis of the rod 12.

To set up the desired gyratory standing wave in the rod 12, fluid is pumped through the turbine at a rate such that the turbine drives the conically gyratory shaft 66 at a number of revolutions per second which results in a number of trips per second of roller 53 around bearing 52 equal to the resonant frequency of the bar 12 for the resonant standing wave performance as desired. Attainment of resonance is readily detected by characteristic manifestations of this condition to which the operator becomes readily sensitive. The large amplitude vibration at resonance emits a characteristic sound, and the evidence of resonance is also clear from vibration imparted to the pipe. As explained hereinabove, the preferred and most advantageous operation is at a frequency just below the peak of resonance, and the operator can readily manage this condition by adjusting fluid inlet pressure at the intake end of the pipe 10. At this point, it may also be pointed out that such a turbine drive inherently possesses the desired characteristic of inverse speed responsiveness to load.

With the oscillator so driven, the rod 12 then undergoes a resonant gyratory standing wave action, as diagrammed in FIG. 4, and as described in the introductory portion of this specification, as well as in my aforementioned Patent No. 2,960,314. A further description of this wave pattern should therefore not be necessary, beyond to note that the antinodal regions V of the rod gyrate bodily, without rotation, by an elastic bending type of action, with an amplitude which increases progressively from each node N to each antinodal region V. The vibratory amplitude even at the antinodes is not great, but the force with which this gyratory motion takes place is very great. The gyratory resonator bar 12 is accordingly a device of very high impedance.

As the consequence of this gyratory action, the bristles or scratchers 13 are correspondingly moved against and across any dirt or accumulated deposits or encrustations on the interior surface of the pipe, which are thus subject to a strong vibratory upbrading and scratching action by which these accumulations can be effectively broken down and removed. In addition, the space around the resonator rod is filled with the liquid discharged from the turbine. This liquid is sealed at the packer 36, and flows from the turbine outlet along the equipment so as to fill in the space between the resonator rod 12 and the interior surface of the pipe. The liquid in this space undergoes cyclic pressure fluctuations responsive to the gyratory vibrational action of the resonator rod. With the high sonic energy equipment of the character here described, these pressure fluctuations within the liquid surrounding the vibratory resonator rod 12 attain such amplitude as to cause cavitation on the negative half cycles of the pressure wave. The violent, nonlinear shock and disruptive effects of cavitation rapidly erode the dirt, debris and encrusted material on the interior surface of the pipe. The joint cavitation and vibratory scratching afforded by the sonic machine of the invention makes available a pipe cleaning performance of unprecedented power and speed.

It has heretofore been described how the pressure fluid through the sonic machine has a forward propulsive effect thereon, and how the machine is therefore held back by the tether 40 so that it does not advance faster than the cleaning process can go to completion. Accordingly, depending upon the nature of the material adhering to the interior surface of the pipe, and its resistance to cleanout, the sonic machine 11 is permitted to advance in the pipe 10 by virtue of the hydraulic thrust thereon of the liquid pumped therethrough by controllably paying out of the tether cable 40.

The underlying theory of the invention has been quite fully explained in the introductory portion of the specification, but may advantageously be here summarized. An acoustic circuit is provided, comprised of the oscillator or vibration generator 14, the driving system for this oscillator 14, the sonic resonator comprised in the illustrative case of the resonator rod 12, and a "load," this load being represented by an impedance which is a complex quantity and which is the resultant of resistance and reactance components. These components are made up of factors as explained hereinabove, and which are subject to substantial change from point to point along the pipe, as well as from instant to instant as cleanout proceeds. It has been explained in detail hereinabove how the orbital-mass type of oscillator accommodates for these changes of impedance by change of phase angle and therefore power factor, as well as change of frequency, so as to assure always a maximum of power delivery to the "load." It has also been explained how the system, particularly when driven from a motive power means having the characteristic of substantial inverse speed responsiveness to load and in the range of resonance, but on the low side of peak resonance frequency, has an inherent frequency stability characteristic which is highly advantageous to the easy and automatic attainment of optimum work rate under all conditions encountered in the operation.

FIG. 4 shows a modification of a portion of FIG. 2. Parts in FIG. 4 corresponding to those of FIGS. 1–3 are identified by corresponding reference numerals, but with the suffix *a* added in the case of FIG. 4. In FIG. 4, the turbine body 16*a* is not equipped with a packer such as the packer 36 of FIG. 1, so that the waste water discharged from the turbine can flow either forward or backward. In this case, water is supplied to the turbine through a long hose 60, which is suitably coupled, as indicated, to the turbine intake. As shown in FIG. 4, the turbine may discharge forwardly through duct 34*a*, and also may discharge partially through a rearwardly directed duct 62. Water so discharged in a rearward direction generates a forward thrust which aids in the propulsion of the equipment through the pipe.

It will of course be understood that the embodiments of the invention here chosen for illustration are merely illustrative of possible physical forms in which the invention may be carried out in practice, and that numerous changes in design, structure, and arrangement may be made without departing from the spirit and scope of the invention as defined in the appended claims.

I claim:

1. A sonic machine for cleanout of encrustations on the interior surfaces of a pipe, comprising:
   an elastically vibratory resonator receivable in said pipe and movable therealong;
   said resonator having a surface area exposed to liquids introduced into the pipe;
   an orbital-mass vibration generator sonically coupled to said resonator for vibrating said resonator at a resonant frequency thereof;
   a drive means for said vibration generator with power means for driving said vibration generator at said resonant frequency of said resonator; and
   means filling the pipe around said resonator with a liquid;
   said encrustations on the interior surface of said pipe in the region of said resonator, and the liquid between the resonator and pipe, comprising a variable impedance load on the sonic circuit comprised of said resonator, said orbital-mass vibration generator, and said drive means.

2. The subject matter of claim 1, wherein said power means is adapted to drive said generator at a frequency in the range of the resonant frequency of said resonator but below the frequency for the peak of resonance.

3. The subject matter of claim 1, including also scratcher means on said vibratory resonator engageable with the inside of said pipe.

4. The subject matter of claim 1, wherein said means for filling the pipe around the resonator with a liquid comprises a liquid supply pipe supplying a liquid under pressure, and means forming a conduit in said sonic machine connected at one end to said liquid supply pipe and opening at the other inside said pipe to be cleaned, said conduit being configured and arranged to provide a forward propulsive thrust on said sonic machine by virtue of liquid flow therethrough.

5. The subject matter of claim 1, wherein said scratcher means comprises a multiplicity of scratcher elements projecting outwardly from said rod into engagement with the inside of the pipe to be cleaned.

6. The subject matter of claim 1, wherein said resonator comprises an elastic rod disposed longitudinally of the pipe to be cleaned;
   said orbital-mass vibration generator is fixed at the rearward end of said rod, and in a disposition such as to exert on said end of said rod a force vector turning in a radial plane about the axis of said rod.

7. The subject matter of claim 6, wherein said drive means comprises a turbine composed of a bladed stator and a bladed rotor rotatably mounted in said stator,
   said stator comprising a body having a liquid inlet passage at the rear leading to said stator and rotor blades, and a liquid discharge passage opening to the interior of the pipe to be cleaned; and
   A rotary drive connection between said turbine rotor and the orbital mass of said orbital-mass vibration generator.

8. The subject matter of claim 7, including a flexible sealing bellows interconnected between the rearward end of said resonator rod and said stator, in a position enclosing said rotary drive connection, and exposing said turbine liquid discharge passage.

9. The subject matter of claim 8, including packer means between said turbine stator and the inside of said pipe, rearwardly of said liquid discharge passage of said turbine stator.

10. The method of sonic cleaning of encrustations from within pipes that comprises:
    inserting into the pipe an elastically vibratory resonator;
    causing a rotor mass to travel orbitally about a bearing means at a frequency in the range of resonance of said resonator;
    coupling the inertial force of reaction so developed at said bearing means to said resonator so as to set said resonator into resonant vibration;
    vibrating scratching means in engagement with the interior of the pipe with said resonator; and
    filling said pipe, in the region of said resonator, with a cavitation liquid.

References Cited

UNITED STATES PATENTS 2,437,456  3/1948  Bodine.
2,960,314  11/1960  Bodine.

MORRIS O. WOLK, *Primary Examiner.*

J. D. OLSEN, *Assistant Examiner.*

U.S. Cl. X.R.

15—104.05; 134—22, 167; 259—1